United States Patent
Rothschild (10) Patent No.: US 7,225,113 B2
(45) Date of Patent: May 29, 2007

(54) SYSTEMS AND METHODS FOR STATISTICAL MODELING OF COMPLEX DATA SETS

(75) Inventor: Walter Galeski Rothschild, Winston-Salem, NC (US)

(73) Assignee: DataRevelation, Inc, Reidsville, NC (US)

( * ) Notice: Subject to any disclaimer, the term of this patent is extended or adjusted under 35 U.S.C. 154(b) by 470 days.

(21) Appl. No.: 10/660,136

(22) Filed: Sep. 11, 2003

(65) Prior Publication Data

US 2004/0059518 A1    Mar. 25, 2004

Related U.S. Application Data

(60) Provisional application No. 60/409,766, filed on Sep. 11, 2002.

(51) Int. Cl.
*G06F 117/10* (2006.01)

(52) U.S. Cl. .......................................................... 703/2

(58) Field of Classification Search ................... 703/2; 700/29–31; 704/240, 256; 382/228
See application file for complete search history.

(56) References Cited

U.S. PATENT DOCUMENTS

| | | | |
|---|---|---|---|
| 5,121,337 A * | 6/1992 | Brown | 702/28 |
| 5,506,817 A * | 4/1996 | O'Brien, Jr. | 367/135 |
| 5,519,647 A * | 5/1996 | DeVille | 708/276 |
| 5,809,499 A | 9/1998 | Wong et al. | |
| 6,026,397 A | 2/2000 | Sheppard et al. | |
| 6,055,541 A | 4/2000 | Solecki et al. | |
| 6,192,319 B1 | 2/2001 | Simonson et al. | |
| 6,611,726 B1 * | 8/2003 | Crosswhite | 700/99 |
| 6,760,632 B1 * | 7/2004 | Heching et al. | 700/33 |
| 6,895,411 B2 * | 5/2005 | Keller | 707/200 |

OTHER PUBLICATIONS

R. M. Ingels et al, How to use the computer to analyze test data, Chemical Engineering, pp. 145-156, Aug. 11, 1980.

* cited by examiner

*Primary Examiner*—Albert W. Paladini
(74) *Attorney, Agent, or Firm*—Kilpatrick Stockton LLP (57) ABSTRACT

The present invention comprises methods and a computer-readable medium comprising programming code for automatic statistical modeling of data. In an embodiment, the analysis is completely automatic with a single computer stroke providing an analysis of data with at least nineteen independent variables. The output is provided in multiple formats, as for example, graphs, reports, spreadsheet files, and an electronic calculator. In an embodiment, approximations of missing data can be automatically calculated and used in the model. The modeling systems and software of the present invention may be used to provide information necessary for manufacturing, business models, scientific endeavors, transportation schedules, and other practical applications.

34 Claims, 3 Drawing Sheets

SYSTEMS AND METHODS FOR STATISTICAL MODELING OF COMPLEX DATA SETS

RELATED APPLICATIONS

The present invention claims priority to U.S. Provisional Application Ser. No. 60/409,766, filed Sep. 11, 2002. The disclosure of U.S. Provisional Application Ser. No. 60/409,766 is incorporated by reference in its entirety herein.

NOTICE OF COPYRIGHT PROTECTION

A section of the disclosure of this patent document and its figures contain material subject to copyright protection. The copyright owner has no objection to the facsimile reproduction by anyone of the patent document, but otherwise reserves all copyright rights whatsoever.

FIELD OF THE INVENTION

The present invention relates in general to the field of data analysis. More particularly, the present invention relates to software for deriving a mathematical equation which describes a data set, and even more particularly, to software for statistical modeling.

BACKGROUND

Currently, the methods available to fit multivariate data to an equation are limited in scope. The state of the current art includes software packages that allow a user to fit one independent variable to a variety of functions. Unfortunately, many types of data have more than one independent variable. Also, such analyses require the user to test each function by trial and error, and the software make no decisions. Other software packages currently available take the approach of fitting one or two independent variables to complex equations by testing the data with thousands of pre-defined formulas. This type of "blind" analysis can result in the creation of models that may include extraneous terms (e.g., multiple terms for only equations only requiring one or two independent variables). Such techniques are not efficient for analyzing data sets requiring large number of independent variables since the number and size of equations to evaluate grows exponentially. Nor do the available packages identify which variable is most important.

Also, many data sets contain missing data due to sampling problems, or in the case of surveys, deliberate omission. One way to handle missing data is to delete an entire record if a value for a single independent variable is missing. This is often not optimal as information corresponding to data that is available for other independent variables is lost.

Thus, there is a need for a computer implemented statistical modeling program that is flexible enough to analyze data sets comprising a plurality of independent variables, but which provides a meaningful mathematical description of the data set. For example, it would be desirable to have the statistical modeling analysis describe the data using a minimum number of terms, so that the significance of each independent variable can be evaluated in a meaningful manner. There is also a need for software that can automatically approximate values for missing data. It would also be beneficial to have a statistical modeling method that provides a series of increasingly complex equations, so that a user can apply the data set to real world problems, and evaluate the models provided by the analysis in light of known physical parameters.

SUMMARY

The present invention provides a statistical modeling program that analyses complex data sets and provides a mathematical model for such data sets using only a few simple keystrokes on a computer. Described herein are methods, systems, and articles of manufacture, which allow a user to develop mathematical models for complex data sets. The modeling program of the present invention does not require that the user has any prior understanding of statistical analysis, and provides a workable model which may be used to provide information necessary for manufacturing, business models, scientific endeavors, transportation schedules, and other practical applications. The present invention also allows a user to generate meaningful values for missing data points and then use the approximated values in subsequent modeling steps, so that entire records, or experiments, do not have to be discarded due to missing data points. Further details and advantages of embodiments of the present invention are set forth below.

DETAILED DESCRIPTION OF THE INVENTION

The present invention provides a computerized method that automatically performs multivariate statistical modeling and missing data approximations. The analysis provided by the software of the present invention is also applicable to two and three-dimensional curve fitting, since two- and three-dimensional curve fitting are subsets of multivariate statistical modeling. In addition, the methodology and software orders the independent variables in order of importance and offers alternative models with fewer terms. The automatic nature of the software makes it easy for users experienced in the field to push data analysis and statistical modeling to a new level, and users with less time or experience can generate a good model with minimal effort.

Thus, in an embodiment, the present invention provides computer-implemented methods to find a mathematical equation to fit a data set.

In yet another embodiment, the present invention comprises a computer program embodied on a computer-readable medium comprising a code to perform the methods of the present invention for finding a mathematical equation that fits a data set.

Thus, in an embodiment, the present invention comprises a computer implemented method and computer programs encoded on a computer readable media to find a mathematical equation that fits a data set having one dependent variable and at least one independent variable comprising determining the relative contribution of the at least one independent variable to the dependent variable, and defining separate functions that each describe the contribution of a single independent variable to the dependent variable, and wherein the functions used to describe the contribution of an independent variable to the dependent variable are derived using residuals of the dependent variable, wherein the residuals comprise the portion of the dependent variable for which a contributing independent variable has not been defined.

In an embodiment, the analysis of residuals is done sequentially, such that at each stage of the analysis, the residuals comprise contributions from a decreasing number of independent variables.

In an embodiment, the method and software is automatic in that once a user initiates the analysis by inputting a signal to the computer processor, the processor performs the method with no further input from the user. The present invention provides methods and computer programs that allow for complicated curve-fitting to be done with little to no input by the user. Alternatively, the methods and programs allow for the user to interact with the software as the analysis proceeds, thereby manipulating the curve-fitting should the need arise.

In an embodiment, the methods and programs of the present invention may further comprise calculating a value for missing data for at least one independent variable. The methods of the present invention allow further flexibility in that missing data for a selected independent variable may be approximated and then the values determined are used to facilitate curve-fitting of other independent variables.

Also, in an embodiment, the method and programs of the present invention further comprising providing a quantitative evaluation of the significance of each independent variable to the equation.

The methods and programs of the present invention utilize sequential residual analysis techniques that are automated to facilitate fitting complex data sets. In an embodiment, up to nineteen independent variables may be fitted to a single equation.

Thus, in an embodiment, the present invention may comprise a computer implemented method and a computer program encoded on a computer readable medium to find a mathematical equation that fits a data set having one dependent variable and at least one independent variable comprising:

(a) identifying the independent variable that makes the largest contribution to the dependent variable (y) as the first most important independent variable (e.g., $x_1$);

(b) plotting the dependent variable versus transformations of the first most important independent variable to determine a function ($f(x_1)$) that provides a model ($y_1 = m_1 * f(x_1) + b_1$) having the best fit to the data;

(c) identifying the independent variable that makes the next largest contribution to the dependent variable (e.g., $x_2$);

(d) plotting the residuals of the dependent variable versus transformations of the next most important variable ($x_2$) to determine a function ($f(x_2)$) that comprises the best fit of $x_2$ to the residuals ($y - \hat{y}_1$), wherein the residuals of the dependent variable comprise the portion of the dependent variable for which a contributing independent variable has not yet been defined, (i.e., the dependent variable minus the function for the first most important variable ($y - \hat{y}_1$);

(e) repeating steps (c) and (d) to identify increasingly important variables ($x_3, \ldots X_{n-1}, x_n$) and defining functions to fit each variable to the residuals of the dependent variable, until an optimal number of functions to describe the dependent variable have been determined.

In an embodiment, the method minimizes the number of terms in the final model.

In an embodiment, the functions used to fit independent variables to the dependent variable or residuals of the dependent variable are chosen from at least one predetermined set of functions. In an embodiment, the set of functions used to fit the independent variable to the residuals for the dependent variable is the same at each step. Alternatively, the set of functions used to fit the independent variable to the residuals for the dependent variable may be different at subsequent steps.

In an embodiment, the step of determining which independent variable comprises the most significant contribution to the dependent variable may comprise the following substeps:

(i) plotting the values of the dependent variable against a predetermined number of selected functions of each independent variable ($x_1, x_2, x_3, \ldots x_{n-1}, x_n$);

(ii) determining how well each function describes the values for the dependent variable (y); and (iii) identifying the most important independent variable (e.g., $x_1$) as having the best fit with at least one of the tested functions. The best fit may be analyzed by determining which function comprises the largest coefficient of determination, R squared ($R^2$), or by other techniques known in the art. In an embodiment, the set of functions used to identify independent variables is smaller than the set of functions used to fit the independent variables to the dependent variable or residuals of the dependent variable.

The method may next comprise the step of determining a function (e.g., $f(x_1)$) and constants (e.g., $m_1$ and $b_1$), from a first set of functions (e.g., $F_{S1}$), which best describes the mathematical relationship between the most important independent variable and the dependent variable (y).

Next, the contribution of the most important independent variable ($x_1$) may be factored out of the equation to allow for the contribution of the other independent variables to (y) to be determined. For example, at this point, the method may include the step of determining the residuals ($y - \hat{y}_1$), where $\hat{y}_1 = m_1 * f(x_1) + b_1$ is the calculated value of y for $x_1$. In this way, the residual ($y - \hat{y}_1$) may be used to determine the contribution of the remaining independent variables ($x_2, x_3, \ldots x_{n-1}, x_n$) to the dependent variable (y).

The method next employs an iterative technique to determine functions that best describe each of the remaining independent variables. For example, in an embodiment, step (c) may comprise: (i) determining the next most significant independent variable (e.g., $x_2$) by plotting the value of the residuals ($y - \hat{y}_1$) against an initial set functions of the remaining independent variables ($x_2, x_3, \ldots x_{n-1}, x_n$); (ii) determining which independent variable comprises the best fit for any one of the predetermined number of analyzed functions (e.g., $x_2$); and (iii) identifying a function $f(x_2)$ and constants (e.g., $m_2$ and $b_2$) which best describes the mathematical relationship between ($x_2$) and the residuals of the dependent variable (e.g., $y - \hat{y}_1$) using a second set functions ($F_{S2}$).

At this point, the next level of residuals, $(y - \hat{y}_{1,2}) = y - ((m_1' * f(x_1)) + (m_2' * f(x_2)) + b')$ are determined and fitted to the remaining independent variables ($x_3, \ldots x_{n-1}, x_n$) using a third preselected set of functions ($F_{S3}$) in order to determine the next most significant independent variable ($x_3$). In an embodiment, the constants ($m_1, m_2$, and b) are recalculated (and thus, in an embodiment, may be represented as $m_1' m_2'$ and b') based upon the combined contribution of $x_1$ and $x_2$ to the dependent variable. A function $f(x_3)$, and constants, $m_3$ and $b_3$, which best describes the mathematical relationship between $x_3$ and $(y-\hat{y}_{1,2})$ can be described. The method is repeated until an optimal number of functions to describe (y) have been characterized, such that an equation may be generated which includes at least one optimized function for at least one independent variable to describe the value of the dependent variable for the entire data set. At each step, the functions to fit the selected independent variable (e.g., $x_1, \ldots x_{n-1}, x_n$) are selected from a predetermined set of functions (e.g., $F_{S1}, \ldots F_{Sn-1}, F_{Sn}$).

In an embodiment, the set of functions used to fit the independent variables to the dependent variable and residuals of the dependent variable may be the same at each fitting step (e.g, $F_{Sn}, =F_{Sn-1}=F_{S3}=F_{S2}=F_{S1}$), thereby simplifying program step selection. Alternately, the set used to fit a less important variable may be larger that sets used to fit more important independent variables (e.g., $F_{Sn}, >F_{Sn-1}, > F_{S3}>F_{S2}>F_{S1}$) since the functions that explain a less important variable (e.g., $x_3$ and $x_2$) in relation to $y-\hat{y}_1$ may not be in the first set of functions ($Fs_{S1}$) required to explain the most important variable (e.g., $x_1$). Alternatively, the set used to fit a more important variable may be larger than sets used to fit less important independent variables (e.g., $F_{S3}<F_{S2}<F_{S1}$), as the function used to define the most important variable (e.g., $x_i$) is not needed to define less important variables.

In an embodiment, the method further comprises calculating a value for missing data for any one independent variable. For example, in an embodiment, values for missing data are calculated by generating a model without the data and then using the model to derive an approximated value for the missing data. Alternatively, the values for missing data are calculated by plotting the independent variable for which the data is missing versus the dependent variable and each of the other independent variables, and estimating a value for the missing data point based on the plot having the best fit. In a further embodiment, the approximated values determined for missing data at one step are used to derive best fit models in subsequent curve-fitting steps.

In an embodiment, the method further comprises analyzing multiple equations in which functions describing an increasing number of independent variable are included. The method may also comprise selecting functions based upon the significance of the contribution of the function to the description of the overall data set. For example, in an embodiment, the output comprises a plurality of equations for the data set such that the first equation comprises the most statistically significant independent variable and associated function, followed by a second analysis comprising the two most statistically significant independent variables and associated functions, followed by a third analysis comprising the three most statistically significant independent variables and associated functions, and so forth, until all of the independent variables have been described.

In yet another embodiment, the program defines the number of terms and thus, the number of statistical models required to analyze the data. Thus, in an embodiment, the method automatically selects the equation that describes the data set in a statistically satisfactory manner while minimizing the number of functions in the equation. Preferably, the R squared value is employed in the analysis.

Also in an embodiment, the report is generated by an operator entering a single keystroke into a computer subsequent to importation of said data set.

In another aspect, the present invention may comprise a system for finding a mathematical equation that fits a data set while minimizing the number of terms in the final model comprising:

(a) an input for receiving a data file;

(b) a computer program embodied on a computer-readable medium for using residual analysis to provide an equation that that fits a data set while minimizing the number of terms in the final model; and (c) an output for generating a final report.

An embodiment of the analysis techniques of the present invention will now be presented. In the embodiment that follows, it is assumed that the data can be modeled using an equation consisting of functions of each independent variable in this general form:

$$y=m_1*f(x_1)+m_2*f(x_2)+m_3*f(x_3)+\ldots m_n*f(x_n)+b \qquad \text{[Equation 1]}$$

In generalized terms, the method involves:

(1) Determining the most important independent variable;

(2) Plotting the dependent variable (y) versus transformations of the most important independent variable to determine the best function with the best fit as described by the coefficient of determination ($R^2$);.

(3) Determining the second most important independent variable to add to the model;

(4) Plotting the residuals of the model found in step (2) versus transformations of the second most important independent variable in order to determine the function with the best fit; and (5) Repeating steps (3) and (4) until all of the variables are then added to the model using a sequential step-by-step residual analysis.

Thus, at each step, the component of the dependent variable (y) that is attributable to the previously defined independent variables is removed before the next most important independent variable is added to the model.

In an embodiment, the first step is to determine the most important independent variable by "plotting" transformations of each independent variable against the dependent variable (y) and looking at the coefficient of determination ($R^2$). "Plotting" may be done with computer code using standard regression techniques utilizing matrix algebra. The initial transformations may include two and three term polynomials as well as other basic transformations. Thus, the transformations are not limited to linear functions. In an embodiment, to save on computer time, a predetermined set of basic polynomial functions is used to identify the most important variable (e.g., $F_{Initial}$). A non-limiting, exemplary set of functions used to identify $x_1$ is provided in Table 1.

The most important independent variable may then be denoted $x_1$, although the specific type of delineation used does not in any way limit the technique. Thus, once the most important variable has been identified (e.g., $x_1$), it may then be analyzed in further detail to determine a function that best describes the relationship of $x_1$ to the dependent variable (y). In an embodiment, this is done by testing families of functions as models to fit $x_1$ to the dependent variable (y). For example, the functions used to fit $x_1$ to the dependent variable (y) may be an expanded (i.e., larger) set of functions (e.g., $F_{S1}$) than is originally used to identify $x_1$ (e.g., $F_{Initial}$). For example, a non-limiting, exemplary set of functions used to fit $x_1$ to y is provided in Table 1. In an embodiment, standard statistical techniques are used to determine the function that best fits $x_1$ to y. For example, in an embodiment, the function selected from the expanded set of functions ($F_{S1}$) that best fits $x_1$ to (y) is the function with the largest $R^2$ value. Another measure of the goodness of fit which may be used is the residual standard deviation which, as the name implies, is the standard deviation of the residual. Yet another measure of the goodness of fit which may be used in an embodiment of the present invention is "adjusted $R^2$" where the degrees of freedom are used in the calculation.

TABLE 1

Exemplary Initial Function Sets and Expanded Function Sets

| | Type | Example |
|---|---|---|
| Some Initial Screening Functions $F_{initial}$ | Two term polynomial | $x + x^2$ |
| | Three term polynomial | $x + x^2 + x^3$ |
| | Log(x) | log(x) |
| Some Expanded Set of Curve Fitting Functions ($F_{S1}$) | Two term polynomial | $x + x^2$ |
| | Power curve | $x^{**}k$ |
| | Sine curve | $sin(x + k)$ |
| | Logarithmic curve | $ln(x + k)$ |
| | Exponential curve | $e^{**}(k * x)$ |
| | Exponential curve B | $e^{**}(k + x)$ |
| | Logistic curve | $1/(1 + (k * e^{**}(-g * x)))$ |

The model is now in the form of:

$$y = m_1 * f(x_1) + b_1 \quad \text{[Equation 2]}$$

The next step is to determine the second most important independent variable and add it to the model. Again, in an embodiment, to save on computer time, a predetermined set of basic polynomial functions ($F_{initial}$) is used to identify the next most important variable. In the embodiment where the next most important independent variable is termed $x_2$, and the model may now take the form:

$$y - (m_1 * f(x_1) + b_1) = m_2 * f(x_2) + b_2 \quad \text{[Equation 3]}$$

and $$y - \hat{y}_1 = m_2 * f(x_2) + b_2 \quad \text{[Equation 4]}$$

Thus, $\hat{y}_1 = m_1 * f(x_1) + b_1$, is the calculated value of (y) for the first most important variable ($x_1$), and ($y - \hat{y}_1$) is the residual of (y) using independent variable $x_1$. Thus, as used herein, a residual comprises the dependent variable wherein the contribution for a defined subset of independent variables is removed.

In the next step, the residuals ($y - \hat{y}_1$) for each data point are plotted against transformations of the remaining independent variables. The independent variable with the highest coefficient of determination using the initial set of functions is the second most important independent variable (e.g., $x_2$). As for $x_1$, the functions (i.e., transformations) used to identify $x_2$ may include two and three term polynomials as well as other basic transformations (Table 1). For example, in an embodiment, the same set of functions, $F_{Initial}$ used to identify $x_1$ is used to defined $x_2$. In an embodiment, different sets of functions may be used to identify different independent variables. Thus, the transformations are not limited to linear functions. In an embodiment, to save on computer time, a predetermined set of basic polynomial functions is used to identify the next most important variable.

More detailed analysis, by fitting $x_2$ to the residuals for the dependent variable ($y - \hat{y}_1$) using functions selected from an expanded set of functions, yields the best function of $x_2$, $f(x_2)$, and new coefficients ($m_2$, $b_2$). In an embodiment, the functions used to fit $x_2$ to ($y - \hat{y}_1$) are derived from the set of functions ($F_{S1}$) used to fit $x_1$ to y. Alternatively, a new set of functions $F_{S2}$ may be used. In an embodiment, $F_{S2} > F_{S1}$, since the function that explains $x_2$ in relation to $y - \hat{y}_1$ may not be in the first set of functions ($F_{S1}$). Alternatively, $F_{S2} < F_{S1}$, as the function used to define $x_1$ is not needed. In another embodiment, $F_{S2} = F_{S1}$, thereby simplifying program step selection.

After a function of an independent variable is added to the model, the constants are recalculated. Thus, at this stage, the model is in this form:

$$y = m_1' * f(x_1) + m_2' * f(x_2) + b', \quad \text{[Equation 5]}$$

where $m_1'$, $m_2'$, and $b'$ are new constants.

A new residual may then be found using independent variables $x_1$ and $x_2$. For example, where the next most important independent variable is $x_3$, the model will be as follows:

$$y - \hat{y}_{1,2} = m_3 * f(x_3) + b_3 \quad \text{[Equation 6]}$$

The residuals may then plotted against initial and basic transformations of the remaining independent variables ($x_3$, $x_4$, ... $x_{n-1}$, $x_n$). The one with the best fit (e.g., highest coefficient of determination, or $R^2$) is the third most important independent variable. Detailed analysis yields the best function of $x_3$, $f(x_3)$, and new coefficients ($m_3$, $b_3$). This process is repeated until functions of all of the independent variables are added to the model, and then new coefficients are determined.

Thus, at the last stage of the analysis, the model will be as follows:

$$y - \hat{y}_{1,2,\ldots n-1} = m_n * f(x_n) + b_n \quad \text{[Equation 7]}$$

Detailed analysis yields the best function of $x_n$, $f(x_n)$, and new coefficients ($m_n$, $b_n$).

Figure 1:
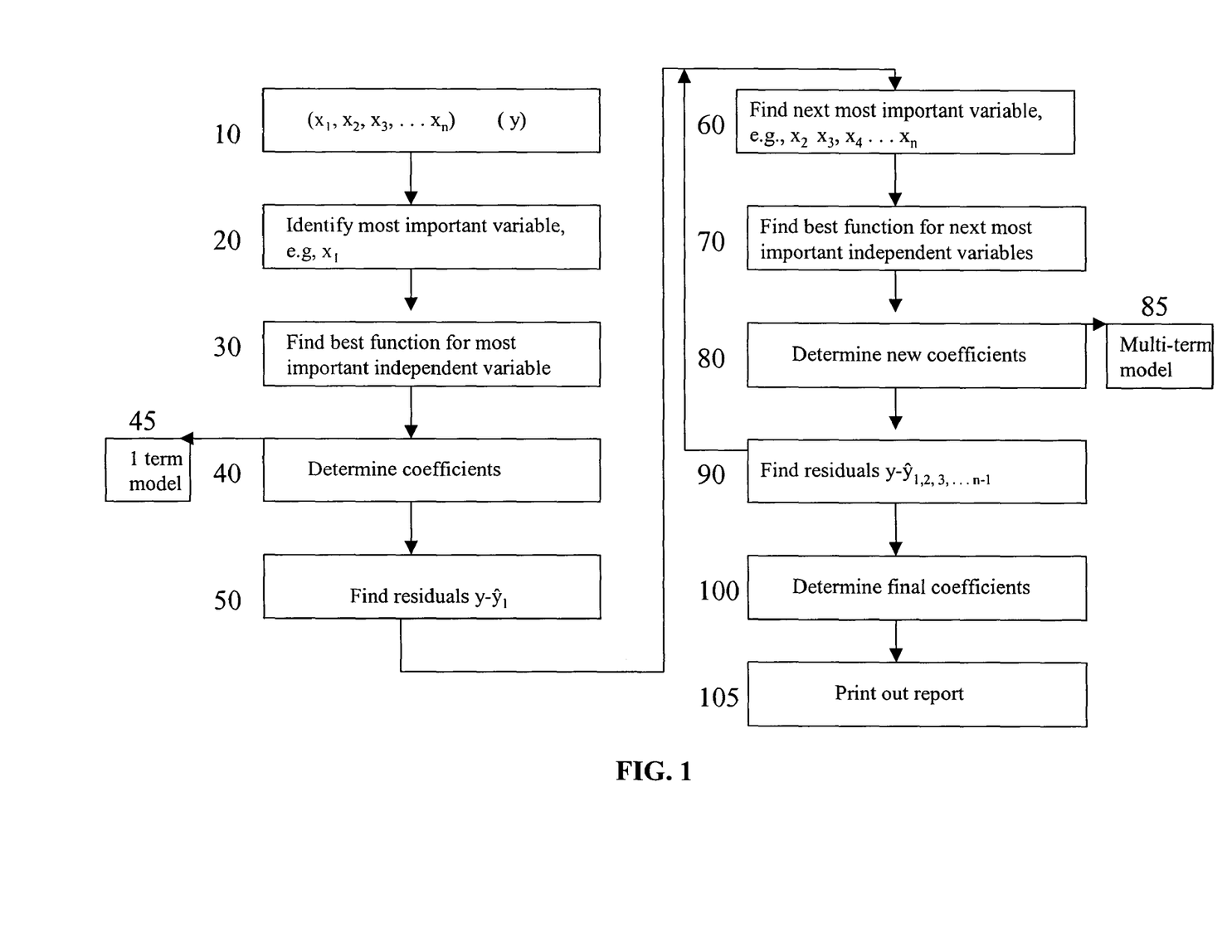
FIG. 1 is a flow chart illustrating an embodiment of the method of the present invention.

An embodiment of the method is presented in FIG. 1. Thus, it can be seen that, in an embodiment of the method, the data are first organized into a data set of independent variables ($x_1$, $x_2$, $x_3$, ... $x_{n-1}$, $x_n$) and a dependent variable (y) (10). Next, the processor determines first most important variable (e.g., $x_1$) by plotting each of the independent variables against a set of functions ($F_{initial}$) (20). Next, the independent variable identified as the most important independent variable (i.e., $x_1$), is fitted to the dependent variable (y) using an expanded set of functions ($F_{S1}$) to define an expression $y = m_1 * f(x_1) + b_1$ that best explains the fit of y to $x_1$ (30). At this point the optimal coefficients are determined (40). In the next step, the processor calculates the residuals ($y - \hat{y}_1$) for each data point (50). The set of remaining independent variables is fit to the residual ($y - \hat{y}_1$) to identify the next most important independent variable (60). At this point, the processor plots the residuals of (y) versus the next most important independent variable to identify a function that best defines the contribution of the independent variable to the residuals (e.g., $y - \hat{y}_1$) (70) and new coefficients are determined (80). At this point, new residuals of y (e.g., $y - \hat{y}_{1,2}$) are determined. Steps (60) through (90) are repeated to identify the next most important variable ($x_3$, $x_4$, ... $x_{n-1}$, $x_n$), and fitting the residuals at each step ($y - \hat{y}_{1,2,3,\ldots n-1}$) to define an expression to fit the contribution of each independent variable to y. Finally, the final coefficients may be determined (100) and an equation describing the contribution of each independent variable may be presented to the user. Alternatively, the report may include an equation showing the fit of the dependent variable to the first most important variable (45) only, or the fit of the dependent variable to the first and second most important variable (85), or the fit to selected independent variables (e.g., the first, second, and third most important independent variable, and the like) (85).

In an embodiment, this step-by-step residual analysis also allows for missing data for one independent variable (e.g., $x_3$) to be automatically approximated and used in subsequent steps of the methodology (e.g., for fitting $x_4, \ldots, x_n$).

Thus, in an embodiment, records (experiments) containing missing data are temporarily removed while that particular independent variable is being analyzed and the best function is being determined. Once the best function is found, the value for the missing data is calculated, and then the record is added back containing the approximation.

For example, if the most important independent variable, $x_1$, contains missing data, then the model is in the form: $y = m_1 * f(x_1) + b_1$. The dependent variable (y), constants $b_1$ and $m_1$, and the function of $x_1$ are known, and therefore the value of $x_1$ can be calculated. This type of analysis can be done at any stage. In another example, if the second most important independent variable, $x_2$, contains missing data, then the model is in the form: $y - \hat{y}_1 = m_2 * f(x_2) + b_2$. The residual $(y - \hat{y}_1)$ using independent variable $x_1$, constants $b_2$ and $m_2$, and the function of $x_2$ are known, and therefore the value of $x_2$ can be calculated.

The above method of approximating missing data is automatic and requires no additional user input. In another embodiment, an alternative method of approximating missing data allows for using the software in a more interactive mode. Thus, in an alternative embodiment, the values for missing data are calculated by plotting the independent variable for which the data is missing versus the dependent variable and each of the other independent variables, and estimating a value for the missing data point based on the plot having the best fit.

Thus, in this embodiment, the independent variable containing missing data is made into the sole independent variable and plotted against every other variable (independent and dependent) as the dependent variable. The $R^2$ from this methodology can be compared to the $R^2$ when the residual is plotted against the independent variable under study in normal, multivariate mode. The software run with the highest $R^2$ indicates the best fit and therefore the best missing data approximation. This method realizes that the function used is not necessarily important when approximating missing data, but what is required is to have a good fit with a high $R^2$ so the missing data can be found on the two-dimensional curve created with this alternative method.

In an embodiment, the methodology and software of the present invention can create as many models as there are independent variables. Typically, but not necessarily, only one term is used for each independent variable. The first model contains only the most important independent variable, and the second model contains the two most important independent variables, etc. The user can compare the coefficient of determination ($R^2$) and number of terms for each model to determine which model is the most desirable.

For example, many data sets will have independent variables that do not significantly improve the coefficient of determination and thus, these independent variables may not be needed in the model. The coefficient of determination will always improve just a little as variables are added to the model, and there is a trade-off between number of terms in the model and coefficient of determination.

The methods and software of the present invention allow the user to experiment with the data to better understand the system being described by the data set. For example, in an embodiment, the software's output may show that $x_5$ is the least important independent variable. The methods and software of the present invention allow the user to determine whether $x_5$ is actually needed to explain the phenomena being studied. To test the hypothesis that $x_5$ is not needed in the model, the user may replace $x_5$ with random numbers between the minimum and maximum values of $x_5$. Running the software again will show if the random numbers help the coefficient of determination as much as $x_5$. If the model containing $x_5$ is better than the model containing random numbers, then $x_5$ should be kept. If not, $x_5$ may be ignored. Thus, the present invention describes methods and computer programs to find a mathematical equation that fits a data set while minimizing the number of terms in the final model.

Thus, the present invention describes methods, computer programs, and systems for using a computer to find a mathematical equation that fits a data set while minimizing the number of terms in the final model. As used herein, statistical modeling provides an equation that describes multivariate data with one or more independent variables. The present invention also comprises curve fitting, which is generally a method for fitting a dependent variable with one or two independent variables.

As used herein, the term "fits a data set" or "best fit" comprises the concept of describing a data set with an equation comprising a predetermined statistical criterion. For example, the value of R squared ($R^2$), the coefficient of determination, may be used as the statistical criterion.

Also as used herein, the "most important" independent variable is defined as the independent variable that contributes the most to the dependent variable. Thus, the most important independent variable is the variable that contributes most to explaining the behavior of the dependent variable, or the independent variable comprising the highest degree of correlation, for example, as measured by R squared, with the dependent variable.

The second most important independent variable is the variable that contributes the second most to the behavior of the dependent variable (y). This will also be the variable that contributes the most to the behavior of $(y - \hat{y}_1)$. Similarly, the third most important independent variable is the variable that contributes the third most to the behavior of y. This will also be the remaining independent variable that contributes the most to the behavior of $(y - \hat{y}_{1,2})$.

Embodiments of computer-readable media include, but are not limited to, an electronic, optical, magnetic, or other storage or transmission device capable of providing a processor with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C#, Visual Basic, Visual Foxpro, Java, and JavaScript.

As used herein, a computer processor or CPU may include, for example, digital logic processors capable of processing input, executing algorithms, and generating output as necessary in response to the inputs received from the touch-sensitive input device. Such processors may include a microprocessor, such as an ASIC, and state machines. Such processors include, or may be in communication with, media, for example computer-readable media, which stores instructions that, when executed by the processor, cause the processor to perform the steps described herein.

The present invention is distinct from other techniques described for automated or semi-automated statistical modeling. The early application of residual analysis as a means for statistical modeling using a computer required extensive human interpretation of the data during the statistical modeling process (see e.g., Ingels, R., Chem. Engineering, Aug. 11, 1980, pp. 145-156) and thus, was not practical or even workable for large data sets. Other applications for computerized statistical analysis have been developed for analysis of predetermined variables, such as how a manifest variable impacts on a latent variable (U.S. Pat. No. 6,192,319) or the use of residual analysis to analyze clustering of data for finding underlying patterns in the data set (U.S. Pat. No. 6,026,397). Other patents relate to automatic report generation, but do not provide a mathematical analysis (U.S. Pat. No. 6,055,541). Thus, the present invention fills a need in the field of providing a mathematical description of a previously unprocessed data set that can be used to analyze the data in terms of the most important variables.

Extra-System Level

In an embodiment, the software program of the present invention is written using a standard Windows® compliant programming language. In this way, the interface is familiar to most and useable on the most number of computers. Examples of programming language that may be used include Visual Basic®, C#®, Access®, Visual Foxpro® from Microsoft or Delphi® from Borland. In an embodiment, Visual Foxpro® is used. Alternatively, custom-derived programming language may be derived.

In an embodiment, the present invention describes a method in a computer to find a mathematical equation that fits a data set while minimizing the number of terms in the final model. In an embodiment, the method comprises operating a computer to organize said data as one dependent variable (y) and at least one independent variable ($x_1$, $x_2$, ... $x_{n-1}$, $x_n$). For example, standard spreadsheet software may be used to organize the data for subsequent analysis steps.

In an embodiment, the data set to be analyzed is in a spreadsheet file format: Suitable spreadsheet formats include, but are not limited to, Excel® from Microsoft or Lotus 1-2-3® from Lotus Software. Spreadsheets are standard way of passing data between applications, and most data collecting software has the option of storing data in a spreadsheet format. Thus, the present invention is compatible with most types of software that can import and export spreadsheet data. In an embodiment, the software of the present invention can walk the user through the importing process with only a few keystrokes (or mouse clicks). Still, the present invention is not limited to a spreadsheet file as a starting point, and other formats and files could be used including typing data into the data set.

Using the present invention, output may be viewed on a computer screen or printed as paper copy reports. The output may also be stored electronically as a spreadsheet file. Thus, by accessing the electronic copy of the results, the user may do the following: (a) further analyze the output; (b) see a non-truncated version of the data (i.e., a data set not limited to a preset number of significant digits), or (c) verify the fit (R squared) and coefficients using standard regression analysis routines available in spreadsheet software.

In an embodiment, graphs of the dependent variable (y) versus each independent variable (with the other variables at their average value) reveal how the data behaves. Also in an embodiment, a calculator is provided using the chosen model so the user can merely type in values for each independent variable and the dependent variable (y) is computed.

In another embodiment, approximations of missing data are displayed on the screen, in a printed report, and in spreadsheet format.

IntraSystem Level

In an embodiment, the present invention first finds the "most important" independent variable wherein "most important" is defined as the variable that contributes the most to the dependent variable. For example, in one embodiment, the program may "plot" the dependent variable versus: (a) every independent variable; (b) two term and three term polynomials of every independent variable; and (c) simple transformations of every independent variable. "Plots" are not done on graph paper, but are done as part of the program using a standard regression analysis routine utilizing matrix algebra. This step gives the most important independent variable.

In the next step, the function that best relates the dependent variable with the most important independent variable is determined. Standard statistical criterion may be used to evaluate the fit of a function of the independent variable to the dependent variable. For example, in an embodiment, the best function is the one with the best fit (R squared). Families of functions are tested and the constants are determined for each family of functions that give the best fit. In an embodiment, because the function that best fits the data is being determined, a large set of functions is surveyed. The function having the best fit is then chosen by the software in automatic mode, or is presented at the top of the pick list in semi-automatic mode. For this example, if variable $x_1$ is most important, the best function $f(x_1)$ is now known. Y versus $f(x_1)$ is plotted to determine the coefficient $m_1$ and the intercept $b_1$. Although for simplicity, $x_1$ is denoted the most important function, with $x_2$ being denoted the second most important, $x_3$ the third most important up to the final independent variable $x_n$, it will be understood that there is no set order of independent variables prior to the analysis. In the next process, the independent variable is not used in the analysis. The residual is used in place of the independent variable. The residual in this first step is: $y-((m_1*f(x_1))+b_1)$.

This residual is then plotted against the remaining independent variables, polynomials, and transformed independent variables in order to come up with the second most important independent variable (e.g., $x_2$). Further analysis, as described above, finds the best function of $x_2$. The dependent variable (y) is then plotted against $f(x_1)$ and $f(x_2)$ using a standard regression analysis routine to arrive at new coefficients and a new intercept yielding this equation: $y=(m_1'*f(x_1))+(m_2'*f(x_2))+b'$.

It is important to note that each time a new independent variable is fitted to the residual of the dependent variable, the constants used to describe the contribution of each independent variable to the dependent variable (e.g., m and b) will change. Thus, $m_1$ and $b_1$, determined when the most important independent variable (e.g., $x_1$) is fit to the dependent variable (y) will be different than $m_1'$ and $b_1'$ determined upon fitting the next most important independent variable (e.g., $x_2$) to the residuals of the dependent variable.

The new residual used is $y-((m_1'*f(x_1))+(m_2'*f(x_2))+b')$. The third most important independent variable is then found ($x_3$ for example). The best function for the third most important independent variable is found (e.g., $f(x_3)$), as well as new values for $m_1''$, $m_2''$, and $b''$.

This logic is repeated until a function of each independent variable is added to the model. Then finally, the dependent variable (y) is plotted, using a standard regression analysis routine, against the best functions of each independent variable to determine new coefficients and an intercept for a function describing each of the independent variables. Thus, in an embodiment, the final model is of the form: $y=m_1f(x_1)+m_2f(x_2)+m_3f(x_3)+\ldots m_nf(x_n)+b$, where the constants have their final values. In an embodiment, the user may choose to select a model with fewer terms since the independent variables at the end of the equation may not be meaningful for the practical application of the data set. For example, one way to determine if adding an independent variable to the model is meaningful is to replace the variable with random numbers between the minimum and maximum values of the questionable independent variable and run the software again. If the random numbers help the model as much as the variable, then it can be concluded that the variable is not needed in the model. Models with fewer terms (and new coefficients and intercept) may yield a model with almost as good of a fit as models with more terms. The software allows the user to select the number of terms desired in the model by presenting a pick list of the number of terms and the associated R squared.

For example, in a model of trucking efficiency, the first three variables (driving hours; route and fuel costs) may provide as much information as the user can practically target. Thus, the addition of additional variables (weather, marital status, age of driver) may add little information compared to the effort of utilizing the data.

In another aspect the present invention comprises a system for finding a mathematical equation that fits a data set while minimizing the number of terms in the final model comprising:

(a) an input for receiving a data file;

(b) a computer program embodied on a computer-readable medium for using residual analysis to provide an equation that that fits a data set while minimizing the number of terms in the final model; and (c) an output for generating a final report.

Figure 2:
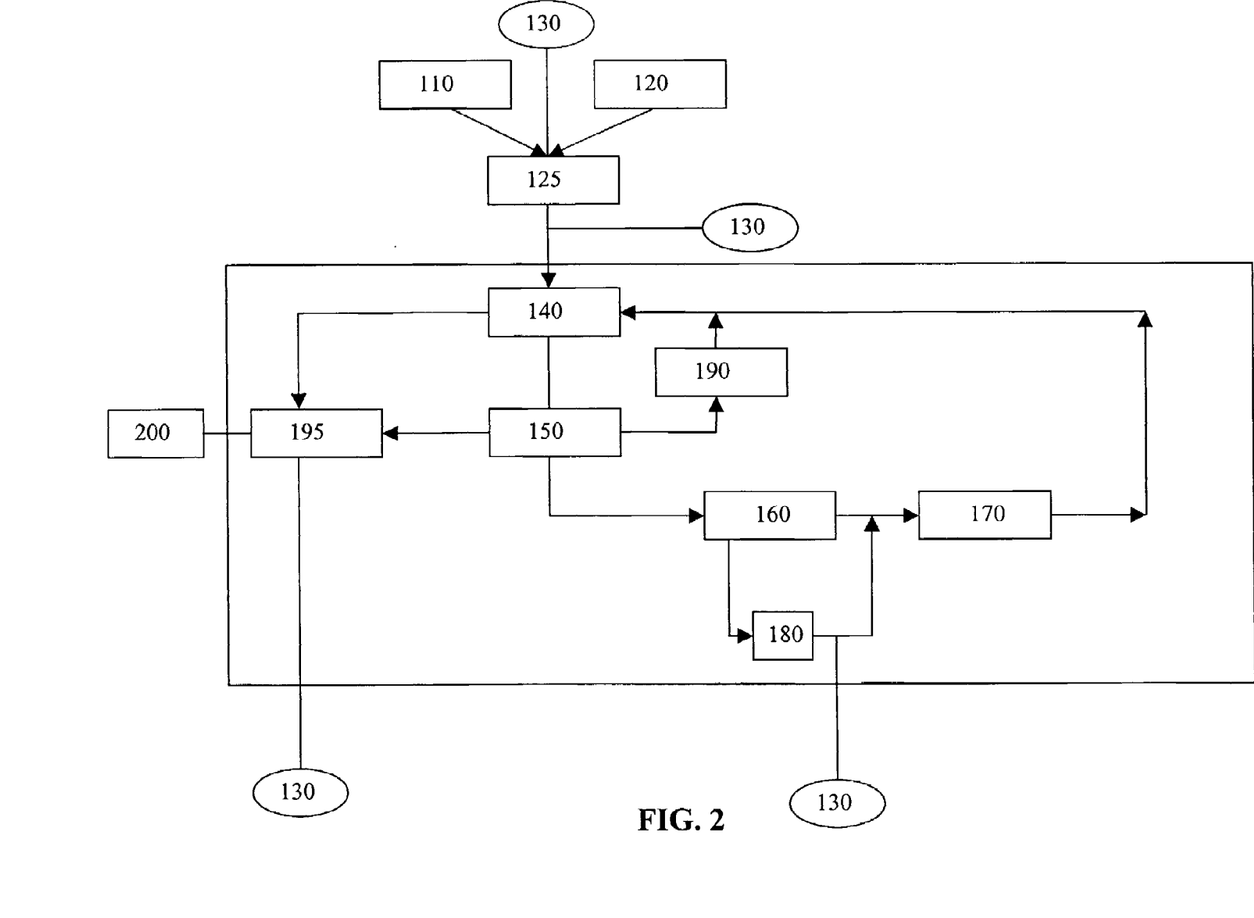
FIG. 2 is a flow chart illustrating a system utilizing an embodiment of the method as encoded in a computer-readable medium in accordance with an embodiment of the present invention.

FIG. 2 shows an embodiment of the flow of information in a system comprising the software of the present invention. Thus, in an embodiment, the starting point for the data may comprise a separate spreadsheet, or multiple spreadsheets, for the independent variables ($x_1$, $x_2$, $x_3$, ... $x_{n-1}$, $x_n$) (110) and a separate spreadsheet file for the dependent variable (y) (120). Alternatively, the program may be written to accept the data as a singe spreadsheet, or any other format or file (125). The user may enter instructions (e.g., via a keyboard or mouse) (130) to import the data. In an embodiment, the user confirms that the data is correct prior to running the program. The data is then stored inside the computer using a storage device common in the art such as disks, drives or memory (140). The user may enter instructions (130) including options for the run, such as if the analysis should be in automatic or semi-automatic mode, if the reports should print out automatically, and the like. The user then initiates the run (e.g., with a mouse click). The information is now in the computer memory, disk, or hard drive (140) and it flows to the central processing unit (CPU) or processor (150). As is understood in the art, the processor is active in all aspects the computer such as disk reads, disk writes, mouse movements, screen output, the flow of data to and from memory, etc. It is also understood in the art that the processor, or central processing unit (CPU), may include more than one processor.

Using the computer program of the present invention, the processor (150) determines the most important independent variable (160) and finds the best function that fits the variable to the dependent variable or residuals of the dependent variable (170). This information is now in the computer disk or memory (140).

In automatic mode, the software and processor determines the function that fits the data best and the user is not needed. In semi-automatic mode the computer presents the user with a pick list (180) ordered by mathematical desirability and the user (130) inputs a signal to identify which function (170) to use to describe the most important independent variable. In automatic mode, the processor selects a function (170) from the pick list (180) based on a predetermined statistical criterion such as the R squared value.

At this point, the information may be stored in memory (140) and the processor (150) may now calculate the residuals (190) based upon the function of the first most important independent variable as described herein. The analysis (equations and residuals) may be stored in memory (140) and is then used by the processor (150) to determine the next most important independent variable (160).

Again, fitting of the selected independent variable to residuals of the dependent variable may be done automatically or in the semi-automatic mode. In automatic mode, the user is not needed to select a function. In semi-automatic mode the user inputs a signal (130) selects the function (170) from the pick list (180) to describe the second most important independent variable. The analysis may again stored in memory (140), and/or is then processed by the processor (150) to determine the second-most important independent variable (190) and a function that best fits the second-most important independent variable to the residuals of the dependent variable.

The analysis may again stored in memory (140) and the residuals based on the first and second most important independent variables is determined (190). The process is repeated until all the independent variables are added to the model. When the last variable is handled, the data may flow from the computer memory (140) to the processor (150) which performs the final regression analysis with each of the pre-selected functions. This information is now in the processor (150). The final model and/or alternative models with some variables removed may be displayed on the monitor (195) in various forms and/or printed (200). Output of the data may be done automatically, or with input from the user.

From the user's perspective, the data is imported with a few mouse clicks, and the run is started with a mouse click. In automatic mode, the model is then available for use and output options.

The present invention provides several technical advantages. At the extra-system level the present invention fits multiple independent variables and can provide a model that has the minimum number of terms for each independent variable. In an embodiment, the method can fit up to nineteen independent variables. In addition, the present invention automatically orders the independent variables by order of importance and provides a statistical assessment of the relative importance of each variable in explaining the data set.

As another advantage, the present invention analyzes evidence, makes decisions, and creates a model. This "thinking" process is unique to the present invention and produces a model, which is optimized at every step. Because the present invention utilizes logical, step-wise decision-making, the final result is an equation which is streamlined to include the fewest number of terms required to explain the data.

At the intra-system level, the present invention combines the organizational structure of a database, standard statistics algorithms, and a unique methodology executed by the software to create a model that is optimized at every step.

The database allows for storage, retrieval, archiving, and manipulating the data set. Also, various permutations of the data set may be generated as part of the methodology. Traditional programming languages, such as BASIC, FORTRAN or C are not generally sufficient for maintaining the complexity of the methodology because only database languages give a logical method of storing and retrieving vast amounts of data and intermediate numbers used in calculations.

Also, at the intra-component level, the present invention allows for the AUTOMATIC creation of a model with only a single keystroke or "mouse click." The present invention also has the capability of automatically approximating missing data and using the approximations while building the statistical models. Other technologies require extensive user interaction and knowledge and thus, results are biased by the user's interpretation and are not generated with the efficiency of computerized approach. Users do not have to experts in statistics to use the present invention. In fact, a complete layperson could use this software.

As an alternative to a "hands-off" or automatic analysis, the present invention also comprises a SEMI-AUTOMATIC mode where the software presents a list of pre-selected functions to the user ordered by mathematical desirability. In this mode, the user can have input into the functions chosen for each independent variable, based upon the perceived desirability of the selected functions.

EXAMPLES

Example 1

Software Description

In an embodiment, the software comprises a program, DataRevelation®. Included below are examples of curve-fitting using the methods and computer software of the present invention in the embodiment presented in the DataRevelation® program.

a. Importation of Data

Spreadsheet software, such as Excel® or Lotus® 1-2-3, has become the standard for passing data between software applications because it is widely available, and it has advanced features for importing, displaying, and saving data. Instead of duplicating these software features, the computer program of the present invention relies on the user's spreadsheet software. Almost any version of Excel or Lotus 1-2-3 will work as a data starting point, and XLS, XL5, WKS, and WK1 formats are supported.

Thus, the IMPORT DATA menu option of the present invention uses a spreadsheet of independent variables ($x_1$, $x_2$, $x_3$, etc.) and a separate spreadsheet containing the dependent variable (y). The file may have any name desired by the user and can be located in any folder. The "import" feature will walk the user through the needed steps. If there is missing data, then the user is given the option to delete records containing missing data or ask the present invention to calculate and use approximations.

b. User Input

The RUN CONTROLS screen prompts the user to supply a name for the data set. The user also checks a box to decide to analyze the data in automatic mode or semi-automatic mode. A RUN button runs the analysis and creates the output.

c. Output

There are at least three alternatives to see the output: (1) printed reports; (2) output that is viewed on the screen; and (3) spreadsheet files that are automatically produced which can be viewed and used with the spreadsheet software.

Four spreadsheet files (Files A-D, described below), containing the same information as the reports, are created automatically for future reference. The spreadsheet files are useful to see more significant digits or if the information in the reports is truncated. A very useful report, PRINT GRAPHS, plots the dependent variable (y) against the independent variables (x).

File A. The models (equations), the corresponding coefficient of determination (R squared), and the functions are printed in a report and held in a spreadsheet file: name_model.xls. The model with only one term uses the most important independent variable, and the model with two terms uses the two most important independent variables, etc. Knowing which independent variables are most important is very useful information. The individual terms in the expression (i.e., the function chosen to fit a particular independent variable to the data set) can illuminate how the variables behave.

File B: The coefficients for the independent variables are printed in a report and held in spreadsheet file: name_coefficient.xls for future reference.

File C: It is important to confirm that the correct data was analyzed and to confirm the independent variable naming ($x_1$, $x_2$, $x_3$, . . . $x_{n-1}$, $x_n$) since the computer program of the present invention will rename the user's column headings to $x_1$, $x_2$, etc. when importing. The first 10 records are printed in a report and held in spreadsheet file: name_datasample.xls.

File D: A spreadsheet file, name_verify.xls contains the transformed independent variables using the models. Excel's LINEST, which performs standard regression analysis, can be used to verify the coefficients and R squared. In this file, the dependent variable (y) is the raw data, and only the independent variables are transformed.

An additional five spreadsheet files may be created to report on actions taken regarding missing data. One shows approximated values for missing data, and the second file shows deleted records that the processor and software deleted because a plausible missing data approximation could not be calculated. The third spreadsheet file shows any missing data records the user chose to delete during the importing process. The fourth and fifth spreadsheet file shows the actual dependent variable and independent variables analyzed including missing data approximations.

Example 2

Sample Run

A sample run is presented below. The sample data included 5 independent variables ($x_1$, $x_2$, $x_3$, $x_4$, and $x_5$), one dependent variable (y) with 45 data samples per variable. The graph of (y) versus each independent variable is shown as FIG. 3.

Figure 3:
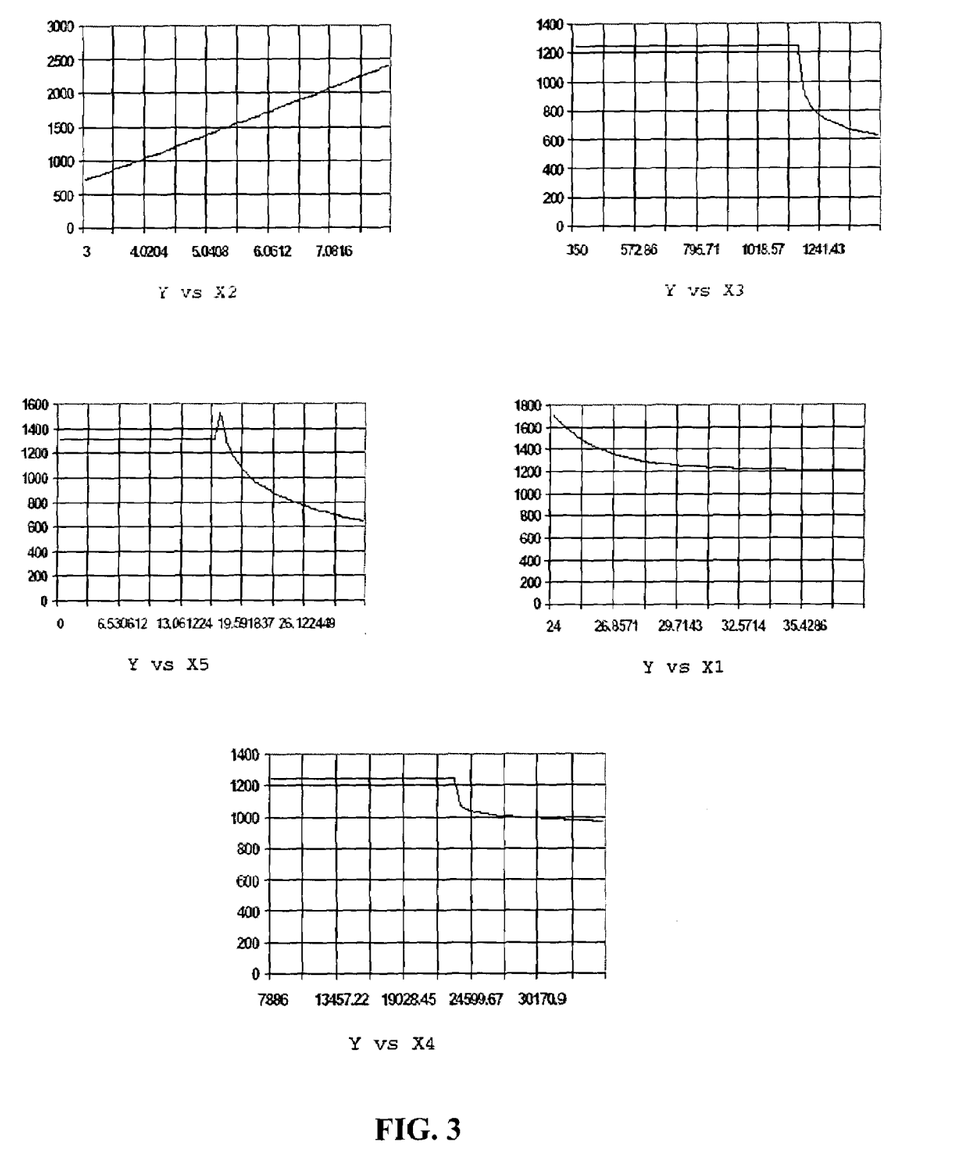
FIG. 3 shows an example of graphs of the dependent variable (y) fit by residual analysis to five different independent variables ($x_1$, $x_2$, $x_3$, $x_4$, and $x_5$) in accordance with an embodiment of the present invention.

The data can be fitted with either one, two, three, four, or five equations, each having 1, 2, 3, 4, or 5 independent variables as shown. It can be seen that the R squared value improves from 0.5994 for an equation with one independent variable to a value of 0.7955 for the equation having 5 independent variables (Table 2).

TABLE 2

| Model* | R squared |
|---|---|
| (A) y = m1*f(x2) + m2*f(x3) + m3*f(x5) + m4*f(x1) + m5*f(x4) + $b_A$ | 0.7955 |
| (B) y = m1*f(x2) + m2*f(x3) + m3*f(x5) + m4*f(x1) + $b_B$ | 0.7847 |
| (C) y = m1*f(x2) + m2*f(x3) + m3*f(x5) + $b_C$ | 0.7617 |
| (D) y = m1*f(x2) + m2*f(x3) + $b_D$ | 0.6931 |
| (E) y = m1*f(x2) + $b_E$ | 0.5994 |

Where f(x2) = (x2)**1.04; f(x3) = LOG(−1153.34 + x3); f(x5) = LOG(−16.56 + x5); f(x1) = EXP(−0.46 * x1); f(x4) = LOG(−23016.53 + x4) as shown in FIG. 3.

For this data set Equation A is the chosen model. Yet for many purposes, Equation B or C may suffice. As used herein, LOG ( ) is the natural logarithm (base e). EXP (X) is e raised to the X power (approximately 2.7183**X). WILDLOG ( ) is the natural logarithm (base e) and is defined to be 0.0 if the argument is less than 1.0. This eliminates the spikes occasionally seen in LOG( ) caused by negative numbers.

The foregoing description of the preferred embodiments of the invention has been presented only for the purposes of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A computer implemented method to derive a model comprising a mathematical equation that fits a data set having one dependent variable and a plurality of independent variables comprising: the steps of determining the relative contribution of each independent variable to the dependent variable; and determining separate functions that each describe the contribution of each independent variable to the dependent variable, wherein the functions used to describe the contribution of an independent variable to the dependent variable are determined sequentially, using residuals of the dependent variable, to define the portion of the dependent variable for which a contributing independent variable has not been defined, such that at each stage of the analysis, the model comprises contributions from an increasing number of independent variables.

2. The method of claim 1, wherein the plurality of independent variables are fit to the data set in order of the relative contribution of each independent variable, such that an independent variable that makes a larger contribution to the dependent variable is fit to the data prior to an independent variable that makes a smaller contribution to the dependent variable.

3. The method of claim 1, wherein the functions used to define the contribution of each independent variable to the dependent variable comprise a set of families of functions.

4. The method of claim 1, further comprising calculating a value for missing data for at least one independent variable.

5. The method of claim 1, further comprising minimizing the number of terms in the final model.

6. A computer implemented method to derive a model comprising a mathematical equation that fits a data set having one dependent variable and a plurality of independent variables comprising the steps of:

(a) identifying the independent variable that makes the largest contribution to the dependent variable as the first most important independent variable;

(b) comparing the numerical values for the dependent variable versus a plurality of transformations of the first most important independent variable, wherein each transformation uses a distinct mathematical function selected from a set of families of functions, to identify a function that provides the best fit of the first independent variable to the data;

(c) identifying the independent variable that makes the next largest contribution to the residual values of the dependent variable as the next most important independent variable;

(d) comparing values for the residuals of the dependent variable versus a plurality of transformations of the next most important variable, wherein each transformation uses a distinct mathematical function selected from a set of families of functions, to identify a function that provides the best fit of the next most important independent variable to the residuals, wherein the residuals of the dependent variable are the portion of the dependent variable for which a contributing independent variable has not yet been defined; and (e) repeating steps (c) and (d) to identify the next most important independent variable until the contribution of each independent variable to the dependent variable has been determined.

7. The method of claim 6, wherein the set of families of functions that are used to fit each independent variable to values for the dependent variable or residuals of the dependent variable are the same.

8. The method of claim 6, wherein step (a) comprises the substeps of:

(i) comparing the values for the dependent variable versus a plurality of transformations of each independent variable from the data set, wherein each transformation uses a function selected from a set of families of functions;

(ii) determining the fit for each independent variable with each of the functions tested in step (i); and (iii) identifying the most important independent variable as the variable having the best fit with at least one of the tested functions.

9. The method of claim 8, wherein the set of functions used to characterize the relative importance of each of the independent variables is smaller than the set of functions used to fit each of the independent variables to the dependent variable or residuals of the dependent variable.

10. The method of claim 6, wherein step (c) comprises the substeps of:

(i) comparing the residual values for the dependent variable versus transformations of each independent variable that have not been fit to the dependent variable or residuals of the dependent variable, wherein each transformation uses a distinct mathematical function selected from a set of families of functions;

(ii) determining the fit for the residual values for the dependent variable versus each of the transformations of each of the remaining independent variables; and (iii) identifying the next most important independent variable as the variable having the best fit upon transformation with one of the selected functions with the residual values for the dependent variable.

11. The method of claim 6, further comprising generating a report comprising a model, wherein the model includes at least one optimized function for each independent variable.

12. The method of claim 11, wherein the report includes a list of optimized models, wherein each of the functions in the list are rated for relative fit to the data using a predetermined statistical function.

13. The method of claim 12, wherein the list of optimized models includes models that comprise a decreasing number of independent variables to describe the fit of the data to the dependent variable.

14. The method of claim 6, further comprising calculating a value for missing data for at least one independent variable.

15. The method of claim 14, wherein values for missing data are calculated by generating a model or best function without missing the data, and then using the model or best function to derive an approximated value for the missing data.

16. The method of claim 14, wherein the approximated values determined for missing data at one step are used to derive best fit models in subsequent curve-fitting steps.

17. A computer implemented method to derive a model comprising a mathematical equation that fits a data set while minimizing the number of terms in the final model comprising the steps of:

(a) organizing the data as one dependent variable (y) and a plurality of independent variables $(x_1, x_2, \ldots x_{n-1}, x_n)$;

(b) determining which independent variable comprises the most significant contribution to the dependent variable by using a program code that performs the following substeps:

(i) comparing values of the dependent variable versus transformations of each of the independent variables, wherein each transformation uses a distinct mathematical function selected from a set of selected families of functions of each independent variable $(x_1, x_2, x_3, \ldots x_{n-1}, x_n)$;

(ii) analyzing how well each function describes the values for the dependent variable (y) for each independent variable; and (iii) choosing an independent variable $(x_1)$ which comprises the best fit to the dependent variable upon transformation with the analyzed functions;

(c) determining a function, $f(x_1)$, and constants, $m_1$ and $b_1$, from a set of families of functions which best describes fit of the data to the independent variable comprising the most significant contribution to the dependent variable;

(d) determining the residuals $(y-\hat{y}_1)$, where $\hat{y}_1 = m_1 * f(x_1) + b_1$ is the calculated value of (y) for $x_1$;

(e) determining the next most significant independent variable by comparing the value of the residuals $(y-\hat{y}_1)$ versus a plurality of transformations of the remaining independent variables $(x_2, x_3, \ldots x_{n-1}, x_n)$, wherein each transformation uses a distinct mathematical function selected from a set of families of functions, and choosing the independent variable $(x_2)$ which comprises the best fit to the residuals using one of the analyzed functions;

(f) determining a function, $f(x_2)$, and constants, $m_2$ and $b_2$, from a set of families of functions, which best describes the independent variable comprising the next most significant contribution to the residuals for the dependent variable $(y-\hat{y}_1)$;

(g) determining the residuals $(y-\hat{y}_{1,2}) = y - ((m_1'*f(x_1)) + (m_2'*f(x_2)) + b')$;

(h) comparing a plurality of transformations of the remaining independent variables $(x_3, \ldots x_{n-1}, x_n)$ versus the second level residuals $(y-\hat{y}_{1,2})$, wherein each transformation uses a distinct mathematical function selected from a set of selected families of functions in order to determine the next most significant independent variable $(x_3)$ and choosing the independent variable $(x_3)$ which comprises the best fit to the residual for one of the analyzed functions;

(i) determining a function $f(x_3)$, and new constants, $m_3$ and $b_3$, which best describes the mathematical relationship between $x_3$ and $(y-\hat{y}_{1,2})$ from a set of families of functions $(F_{S2})$;

(j) repeating steps (g)-(i) using increasing levels of residuals $(y-y_{1,2,3,\ldots n-1})$ to characterize additional independent variables $(x_4, \ldots x_{n-1}, x_n)$ until the contribution of each independent variable to the dependent variable (y) has been described; and (k) generating a model comprising an equation which includes at least one optimized function for each independent variable to describe the value of the dependent variable for the entire data set.

18. A computer-readable medium on which is encoded programming code to derive a model comprising a mathematical equation that fits a data set having one dependent variable and a plurality of independent variables comprising: program code for determining the relative contribution of each independent variable to the dependent variable; and for determining separate functions that each describe the contribution of each independent variable to the dependent variable, wherein the functions used to describe the contribution of an independent variable to the dependent variable are determined sequentially, using residuals of the dependent variable to define the portion of the dependent variable for which a contributing independent variable has not been defined, such that at each stage of the analysis, the model comprises contributions from an increasing number of independent variables.

19. The computer-readable medium of claim 18, wherein the program code defines that the plurality of independent variables are fit to the data set in order of the relative contribution of each independent variable, such that an independent variable that makes a larger contribution to the dependent variable is fit to the data prior to an independent variable that makes a smaller contribution to the dependent variable.

20. The computer-readable medium of claim 18, wherein the program code defines that the functions used to define the contribution of each independent variable to the dependent variable comprise a set of families of functions.

21. The computer-readable medium of claim 18, further comprising program code for calculating a value for missing data for at least one independent variable.

22. The computer-readable medium of claim 18, further comprising program code for minimizing the number of terms in the final model.

23. A computer-readable medium on which is encoded programming code to derive a model comprising a mathematical equation that fits a data set having one dependent variable and a plurality of independent variables comprising:

(a) program code for identifying the independent variable that makes the largest contribution to the dependent variable as the first most important independent variable;

(b) program code for comparing the numerical values for the dependent variable versus a plurality of transformations of the first most important independent variable, wherein each transformation uses a distinct mathematical function selected from a set of families of functions, to identify a function that provides the best fit of the first independent variable to the data;

(c) program code for identifying the independent variable that makes the next largest contribution to the residual values of the dependent variable as the next most important independent variable;

(d) program code for comparing values for the residuals of the dependent variable versus a plurality of transformations of the next most important variable, wherein each transformation uses a distinct mathematical function selected from a set of families of functions, to identify a function that provides the best fit of the next most important independent variable to the residuals, wherein the residuals of the dependent variable are the portion of the dependent variable for which a contributing independent variable has not yet been defined; and (e) program code for repeating steps (c) and (d) to identify the next most important independent variable until the contribution of each independent variable to the dependent variable has been determined.

24. The computer-readable medium of claim 23, further comprising program code for choosing the set of families of functions that are used to fit each independent variable to values for the dependent variable or residuals of the dependent variable.

25. The computer-readable medium of claim 23, wherein the program code for (a) further comprises:

(i) program code for comparing the values for the dependent variable versus a plurality of transformations of each independent variable from the data set, wherein each transformation uses a function selected from a set of families of functions;

(ii) program code for determining the fit for each independent variable with each of the functions tested in step (i); and (iii) program code for identifying the most important independent variable as the variable having the best fit with at least one of the tested functions.

26. The computer-readable medium of claim 25, wherein the set of functions used to characterize the relative importance of each of the independent variables is smaller than the set of functions used to fit each of the independent variables to the dependent variable or residuals of the dependent variable.

27. The computer-readable medium of claim 23, wherein the program code for (c) further comprises:

(i) program code for comparing the residual values for the dependent variable versus transformations of each independent variable that have not been fit to the dependent variable or residuals of the dependent variable, wherein each transformation uses a distinct mathematical function selected from a set of families of functions;

(ii) program code for determining the fit for the residual values for the dependent variable versus each of the transformations of each of the remaining independent variables; and (iii) program code for identifying the next most important independent variable as the variable having the best fit upon transformation with one of the selected functions with the residual values for the dependent variable.

28. The computer-readable medium of claim 23, further comprising program code for generating a report comprising the model, wherein the model includes at least one optimized function for each independent variable.

29. The computer-readable medium of claim 28, wherein the report includes a list of optimized models, wherein each of the functions in the list are rated for relative fit to the data using a predetermined statistical function.

30. The computer-readable medium of claim 29, wherein the list of optimized models includes models that comprise a decreasing number of independent variables to describe the fit of the data to the dependent variable.

31. The computer-readable medium of claim 23, further comprising program code for calculating a value for missing data for at least one independent variable.

32. The computer-readable medium of claim 31, further comprising program code to calculate the values for missing data by generating a model or best function without the missing data, and then using the model or best function to derive an approximated value for the missing data.

33. The computer-readable medium of claim 31, further comprising program code to use the approximated values determined for missing data at one step to derive best fit models in subsequent curve-fitting steps.

34. A computer-readable medium on which is encoded programming code to derive a model comprising a mathematical equation that fits a data set while minimizing the number of terms in the final model comprising:

(a) program code for organizing the data as one dependent variable (y) and a plurality of independent variables $(x_1, x_2, \ldots x_{n-1}, x_n)$;

(b) program code for determining which independent variable comprises the most significant contribution to the dependent variable by using a program code that performs the following substeps:

(i) comparing values of the dependent variable versus transformations of each of the independent variables, wherein each transformation uses a distinct mathematical function selected from a set of families of functions of each independent variable $(x_1, x_2, x_3, \ldots x_{n-1}, x_n)$;

(ii) analyzing how well each function describes the values for (y) for each independent variable; and (iii) choosing an independent variable $(x_1)$ which comprises the best fit of the dependent variable with one of the analyzed functions;

(c) program code for determining a function, $f(x_1)$, and constants, $m_1$ and $b_1$, from a set of families of functions which best describes the fit of the data to the independent variable comprising the most significant contribution to the dependent variable;

(d) program code for determining the residuals $(y-\hat{y}_1)$, where $\hat{y}_1 = m_1 * f(x_1) + b_1$ is the calculated value of (y) for $x_1$;

(e) program code for determining the next most significant independent variable $(x_2)$ by comparing the value of the residuals $(y-\hat{y}_1)$ versus a plurality of transformations of the remaining independent variables $(x_2, x_3, \ldots x_{n-1}, x_n)$, wherein each transformation uses a distinct mathematical function selected from a set of families of functions, and choosing the independent variable $(x_2)$ which comprises the best fit for any one of the predetermined number of analyzed functions;

(f) program code for determining a function, $f(x_2)$, and constants, $m_2$ and $b_2$, from set of families of functions, which best describes the fit of the data to the independent variable comprising the next most significant contribution to the residuals for the dependent variable;

(g) program code for residuals $(y-\hat{y}_{1,2})=y-((m_1'*f(x_1))+(m_2'*f(x_2))+b')$;

(h) program code for comparing a plurality of transformations of the remaining independent variables $(x_3, \ldots x_{n-1}, x_n)$ versus the second level residuals $(y-\hat{y}_{1,2})$, wherein each transformation uses a distinct mathematical function selected from a set of selected families of functions in order to determine the next most significant independent variable $(x_3)$ and choosing the independent variable $(x_3)$ which comprises the best fit to the residuals for one of the analyzed functions;

(i) program code for determining a function $f(x_3)$, and new constants, $m_3$ and $b_3$, which best describes the mathematical relationship between $x_3$ and $(y-\hat{y}_{1,2})$ from a set of families of functions $(F_{S2})$;

(j) program code for repeating steps (g)-(i) using increasing levels of residuals $(y-y)_{1,2,3,\ldots,n-1}$ to characterize additional independent variables $(x_4, \ldots x_{n-1}, x_n)$ until the contribution of each independent variable to the dependent variable (y) has been described; and (k) program code for generating a model comprising an equation which includes at least one optimized function for each independent variable to describe the value of the dependent variable for the entire data set.

* * * * *